(12) United States Patent
Chang

(10) Patent No.: US 8,250,804 B2
(45) Date of Patent: Aug. 28, 2012

(54) PLANT POT HOLDING DEVICE

(76) Inventor: Cheng Chung Chang, Taichung Hsien (TW)

(*) Notice: Subject to any disclaimer, the term of this patent is extended or adjusted under 35 U.S.C. 154(b) by 138 days.

(21) Appl. No.: 12/590,888

(22) Filed: Nov. 16, 2009

(65) Prior Publication Data

US 2011/0113685 A1    May 19, 2011

(51) Int. Cl.
*A01G 9/02* (2006.01)
*A01G 9/00* (2006.01)
*A47G 7/00* (2006.01)

(52) U.S. Cl. .................................. 47/39; 47/83; 47/65.9

(58) Field of Classification Search ................ 47/62 R, 47/65.9, 82, 83, 86, 39; 248/27.8, 222.11; 211/81, 85, 85.17, 85.21, 85.23, 126.2–126.4, 211/126.6, 126.14, 131.1, 131.2, 132.1; *A47G 7/00*
See application file for complete search history.

(56) References Cited

U.S. PATENT DOCUMENTS

| 375,844 A * | 1/1888 | Toohey ................. 211/85.17 |
| 1,897,905 A | 2/1933 | Johnson |
| 3,047,158 A * | 7/1962 | Scholl ................... 211/85.17 |
| 3,664,062 A | 5/1972 | Danielson |
| 4,034,508 A | 7/1977 | Dedolph |
| 4,312,152 A | 1/1982 | Drury et al. |
| 4,620,390 A | 11/1986 | Mekler |
| 4,658,542 A | 4/1987 | Holmberg |
| 7,080,482 B1 * | 7/2006 | Bradley ........................ 47/60 |
| 7,886,482 B2 * | 2/2011 | DiMaggio ..................... 47/39 |
| 2003/0089037 A1 * | 5/2003 | Ware .............................. 47/83 |
| 2006/0156624 A1 * | 7/2006 | Roy et al. ................... 47/62 R |
| 2007/0235397 A1 * | 10/2007 | Wannop ...................... 211/81 |
| 2009/0183427 A1 * | 7/2009 | DiMaggio ..................... 47/39 |
| 2009/0211154 A1 * | 8/2009 | DiMaggio ..................... 47/83 |
| 2010/0037517 A1 * | 2/2010 | Copping et al. ............... 47/79 |
| 2010/0095586 A1 * | 4/2010 | Sichello .................... 47/65.9 |
| 2010/0146855 A1 * | 6/2010 | Ma ................................ 47/82 |

FOREIGN PATENT DOCUMENTS

GB            2096443 A    * 10/1982

* cited by examiner

*Primary Examiner* — Son T Nguyen
*Assistant Examiner* — Kathleen Iwasaki
(74) *Attorney, Agent, or Firm* — Muncy, Geissler, Olds & Lowe, PLLC

(57) ABSTRACT

A plant pot holding device includes one or more panels each having a number of compartments formed with a wider front portion and a narrower rear portion for detachably engaging with plant pots, the plant pots each include a lower notch for engaging with the lower inclined surface of the panel and an upper engaging surface and a latch for engaging with the panel and for detachably attaching and latching the plant pots to the panel, the panels each include one or more couplers and one or more socket openings for selectively engaging with each other and for detachably coupling the panels together to form various spatial or three-dimensional shapes and for detachably supporting a number of plant pots.

14 Claims, 12 Drawing Sheets

PLANT POT HOLDING DEVICE

BACKGROUND OF THE INVENTION

1. Field of the Invention

The present invention relates to a plant pot holding device, and more particularly to a plant pot holding device including one or more panels that may be selectively or changeably engaged or coupled together to various shapes or configurations, such as the spatial or three-dimensional shapes or configurations, and including a number of compartments formed in each of the panels for detachably engaging with or supporting plant pots.

2. Description of the Prior Art

Typical plant pot holding devices comprise a supporting stand or rack including one or more frames, plates, shelves or spring hooks each having one or more socket openings or recesses for detachably engaging with or supporting one or more plant pots therein.

For example, U.S. Pat. No. 1,897,905 to Johnson discloses one of the typical plant pot holding devices or flower stands including a structure or arrangement for supporting a number of flower pots simultaneously, and including an adjustable structure or configuration that may be adjusted to meet the requirements of the user.

However, the adjustable structure or configuration of the typical plant pot holding devices or flower stands may only be used to support few flower pots, but may not be assembled to larger or greater supporting structures or configurations and to support more flower pots.

U.S. Pat. No. 3,664,062 to Danielson, U.S. Pat. No. 4,034,508 to Dedolph, U.S. Pat. No. 4,312,152 to Drury et al., U.S. Pat. No. 4,620,390 to Mekler, and U.S. Pat. No. 4,658,542 to Holmberg disclose few more typical plant pot holding devices or flower stands each including a lower support bench having a number of cells or recesses or openings formed therein for detachably receiving or engaging with or supporting flower pots or plant pots.

However, normally, the lower support bench may only be used to support few flower pots in a horizontal surface, but may not be assembled to larger or greater supporting structures or configurations and thus may not be used to support a large number of flower pots or plant pots.

The present invention has arisen to mitigate and/or obviate the afore-described disadvantages of the conventional plant pot holding devices.

SUMMARY OF THE INVENTION

The primary objective of the present invention is to provide a plant pot holding device including one or more panels that may be selectively or changeably engaged or coupled together to various shapes or configurations, such as the spatial or three-dimensional shapes or configurations.

The other objective of the present invention is to provide a plant pot holding device including a number of compartments formed in each of the panels for detachably engaging with or supporting plant pots.

In accordance with one aspect of the invention, there is provided a plant pot holding device comprising a panel including a number of compartments formed therein, and including an upper inclined surface, a lower inclined surface, and two side inclined surfaces for forming each of the compartments and for forming a wider front portion and a narrower rear portion for each compartment of the panel, and a number of plant pots for detachably engaging into the compartments of the panel respectively, and the plant pots each including a notch formed in a lower portion thereof for engaging with the lower inclined surface of the panel and for easily and quickly latching and anchoring and retaining or engaging the plant pots with the panel, and each including two side walls, and each including an upper engaging surface formed in each side wall for engaging with the upper inclined surface of the panel and for further easily and quickly latching and anchoring and retaining or engaging the plant pots with the panel, and each including a latch extended from each of the side walls for engaging with the panel and for easily and quickly and detachably attaching and latching the plant pots to the panel.

The plant pots each include an outwardly extended stop formed on each of the side walls for engaging with the panel and for further latching and anchoring and retaining the plant pot to the panel. The plant pots each include a depression formed in each of the side walls.

The plant pots each include a tray engaged therein. The tray is preferably a perforated tray. The tray may also be formed integral with the plant pot. The tray includes a notch formed in a lower portion thereof for engaging with the lower inclined surface of the panel.

The plant pot holding device may include a number of panels each having at least one coupler formed in a first side portion thereof and at least one socket opening provided on a second side portion thereof for selectively engaging with the coupler and for detachably coupling the panels together. The coupler is preferably a ball shaped coupler.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 4:
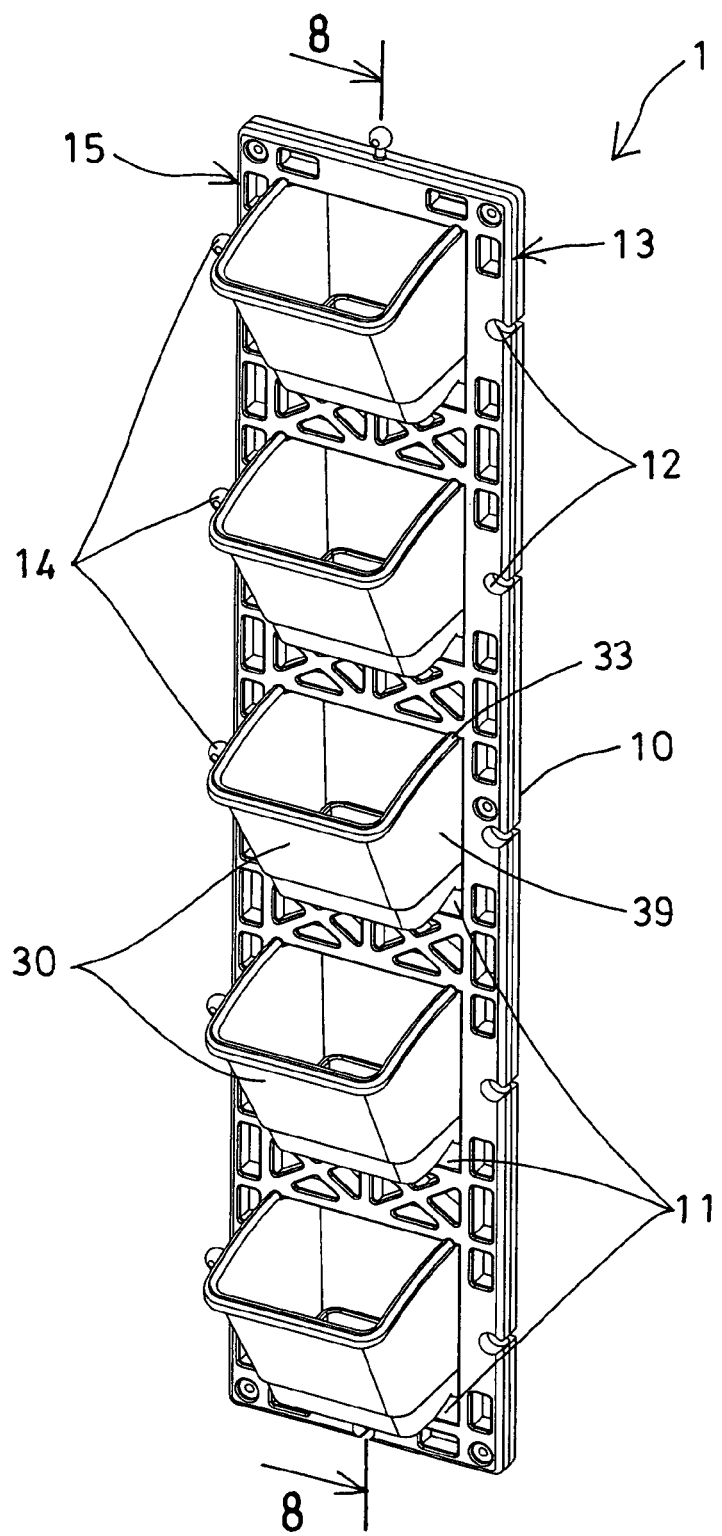
FIG. 4 is a further perspective view illustrating one of the panels or units of the plant pot holding device.
Figure 12:
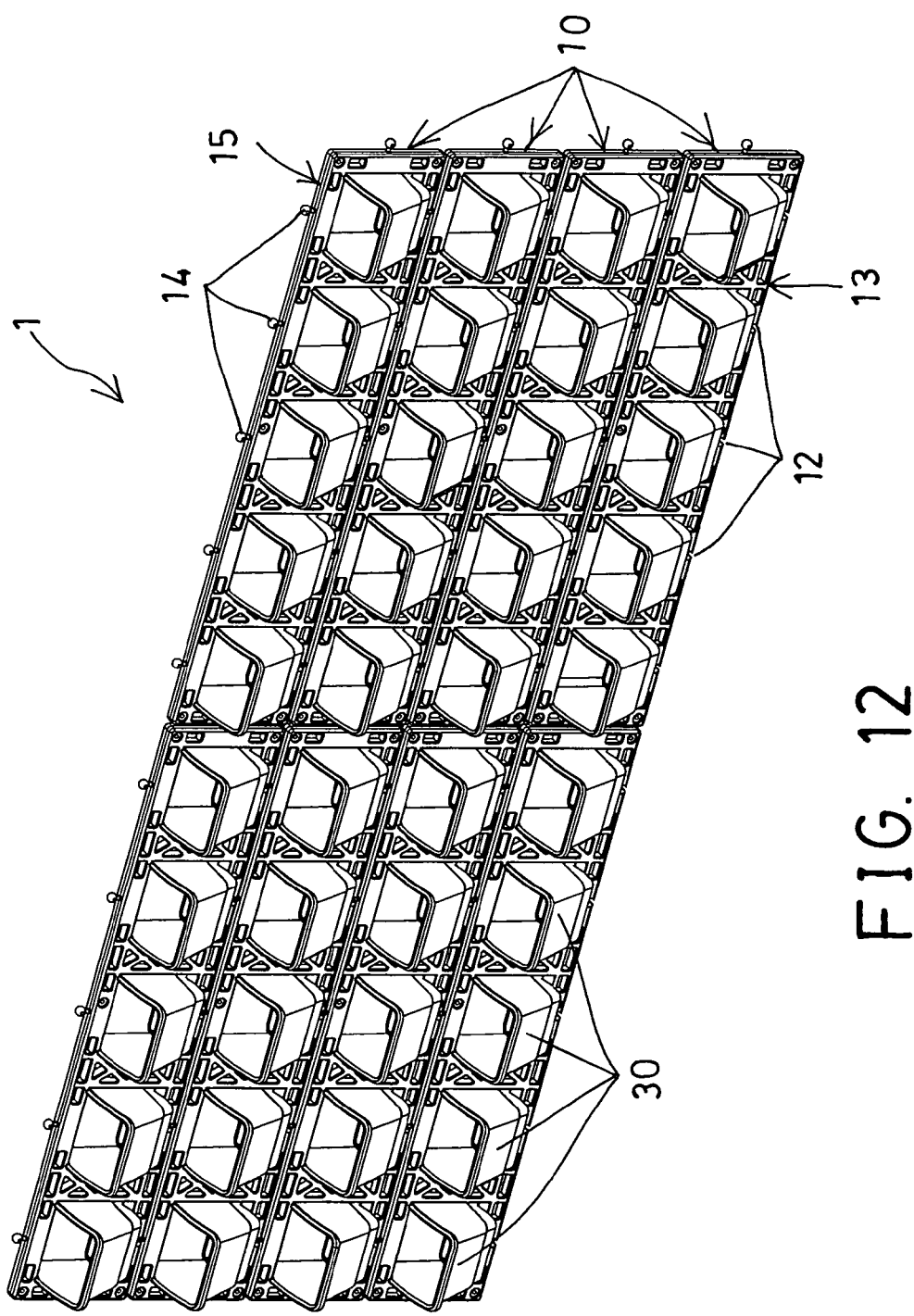
FIGS. 12, 13, 14, 15 are further perspective views illustrating the other arrangement of the plant pot holding device.
Figure 13:
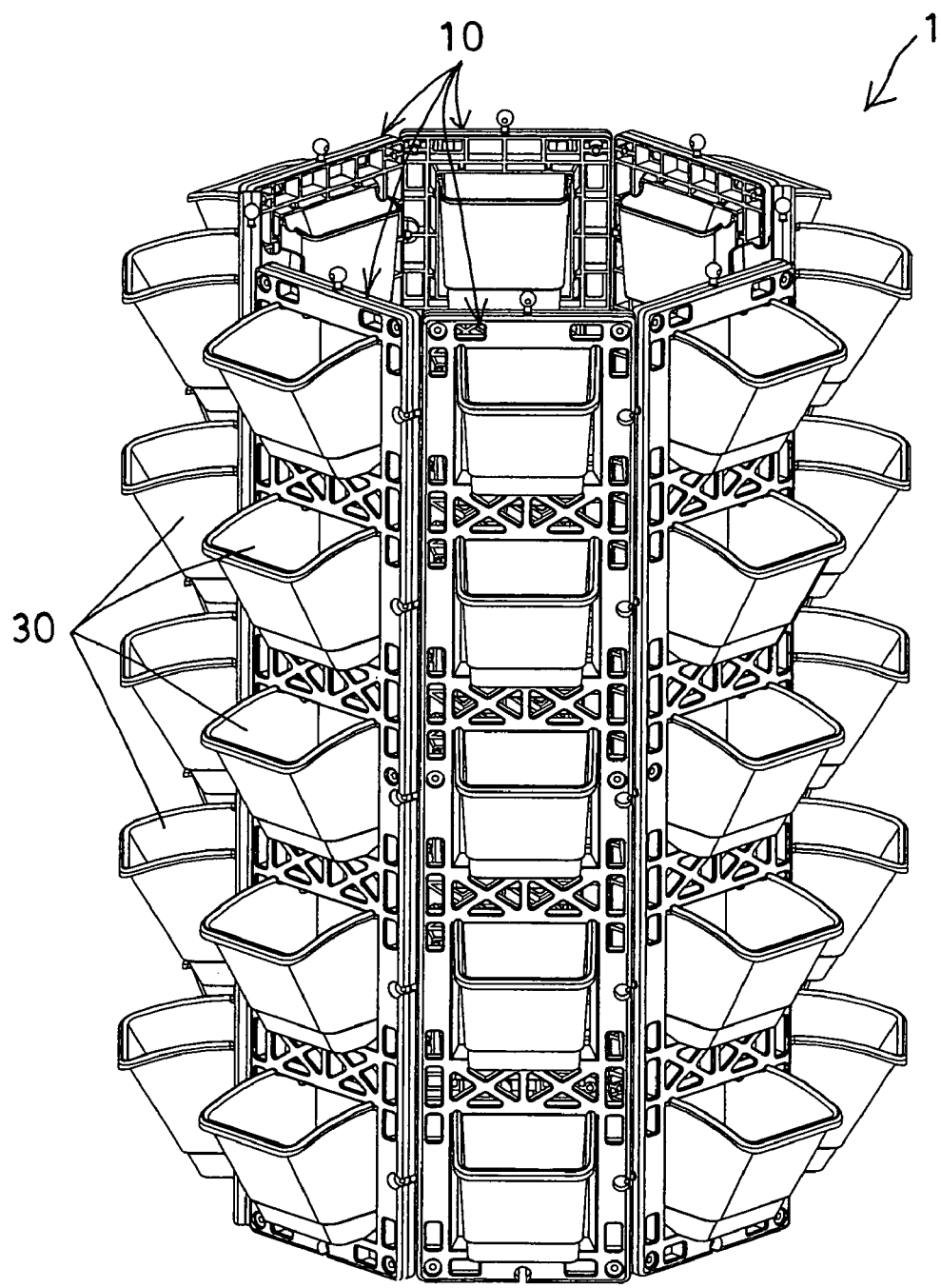
Figure 14:
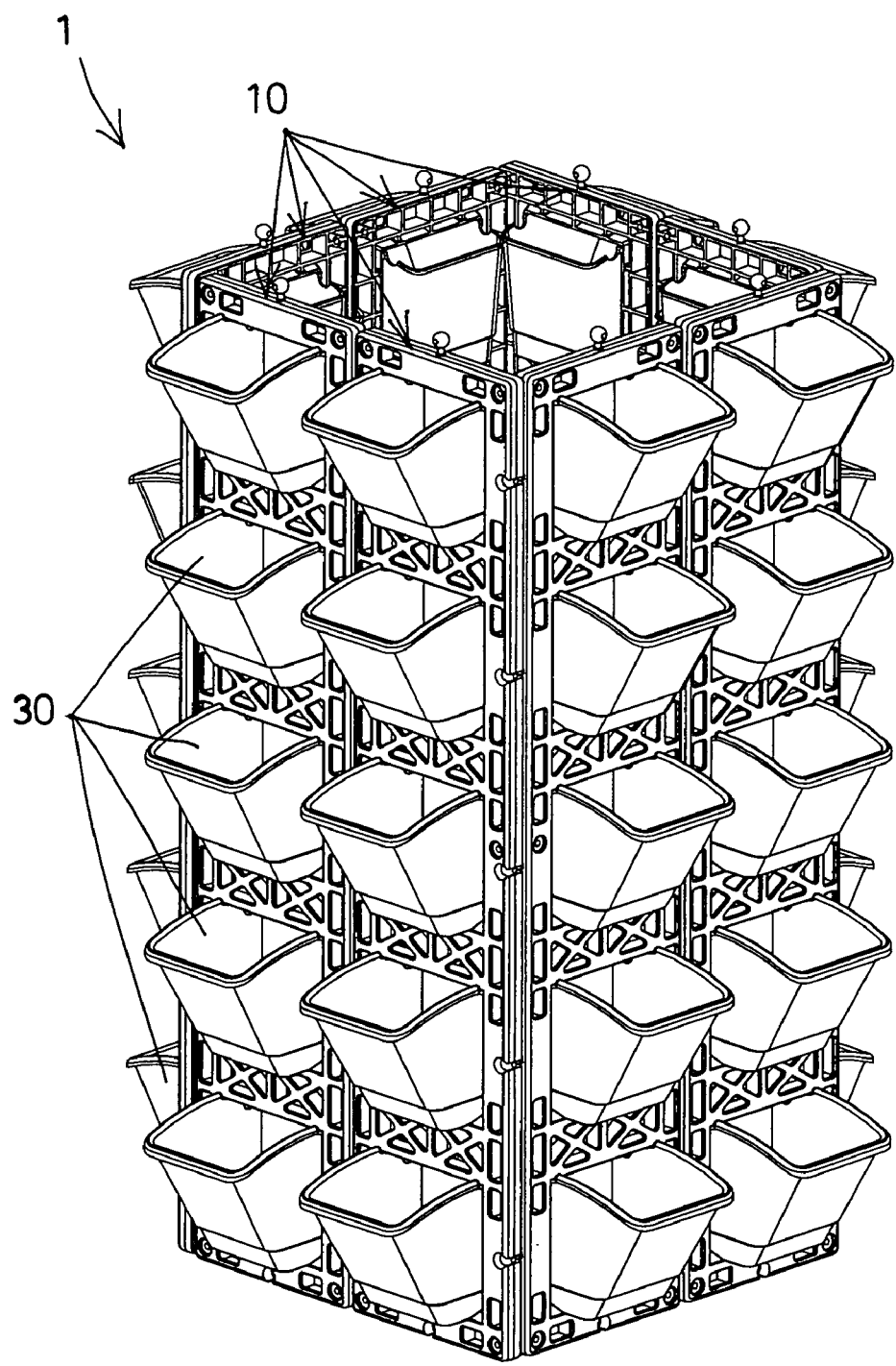
Figure 15:
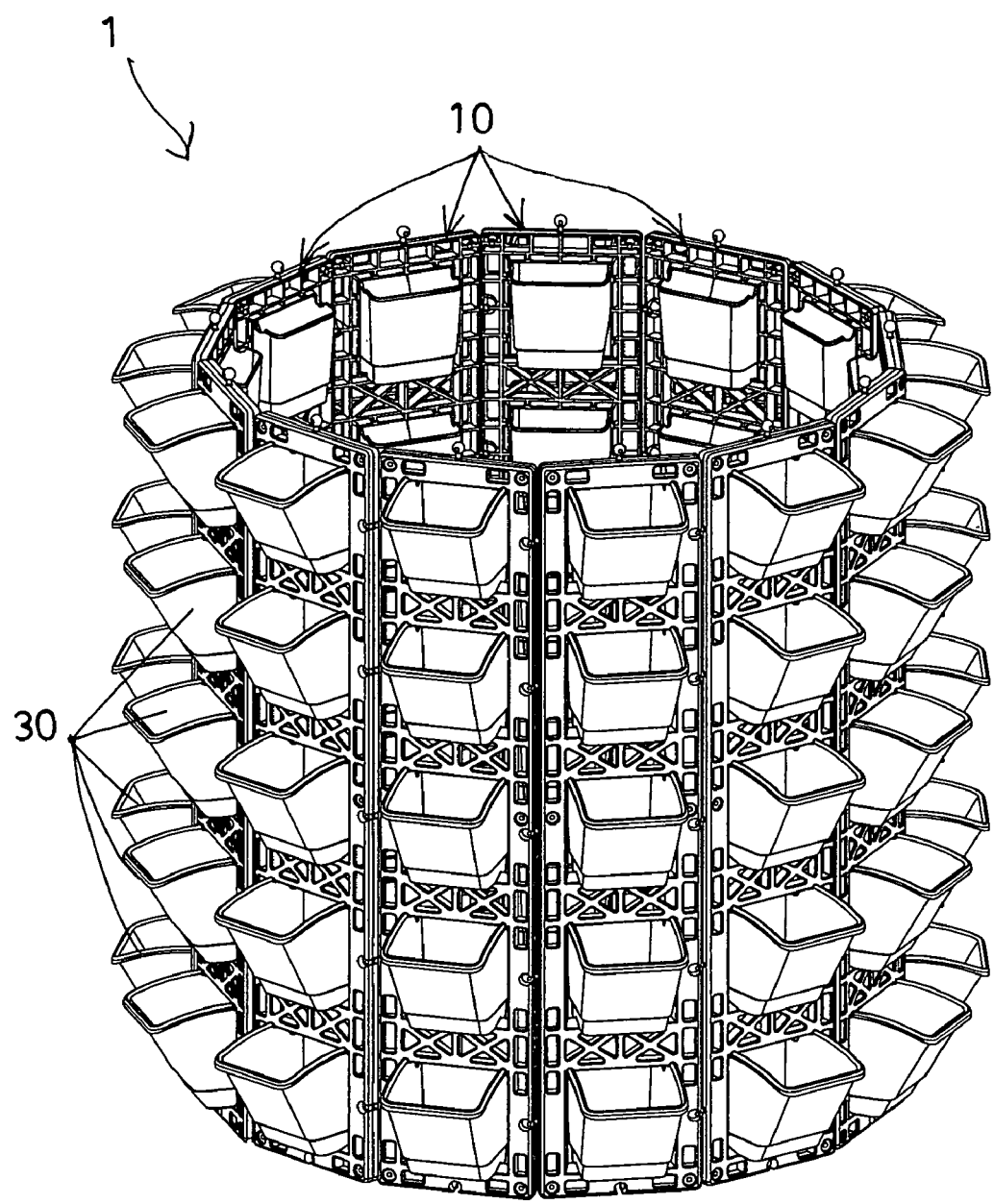

Referring to the drawings, and initially to FIGS. 1-3 and 12-15, a plant pot holding device 1 in accordance with the present invention comprises one or more units or panels that may be selectively or changeably engaged or coupled together to various shapes or configurations, such as the planar structure or configuration as shown in FIGS. 4, 12, or the square or column-like or parallelepiped structure or configuration as shown in FIGS. 1-3 and 14, or the octangular structure or configuration as shown in FIG. 13, or the cylindrical shaped structure or configuration as shown in FIG. 15, and the panels 10 each include a number of compartments 11 formed therein for detachably engaging with or supporting plant pots 30.

For example, as shown in FIGS. 3-6 and 9-11, the panels 10 each include one or more or a number of socket openings 12 formed therein, such as formed in first side portion 15 thereof, and each include one or more or a number of projections or couplers 14, such as the spherical or ball shaped couplers 14 formed or provided on a second side portion 13 thereof for selectively engaging with the socket openings 12 of the other panels 10 and for selectively or changeably anchoring or securing or coupling the panels 10 together to various spatial shapes or configurations, and thus for supporting a large number of flower pots or plant pots 30. It is to be noted that many more panels 10 may be provided and may be selectively or changeably engaged with or coupled or secured together to support or to hold as many as flower pots or plant pots 30 as required by the users.

As shown in FIGS. 3, 5 and 8-9, the panel 10 includes an upper inclined surface 16, a lower inclined surface 17, and two side inclined surfaces 18, 19 formed or provided therein for forming or defining each of the compartments 11 thereof and for forming a wider front portion and a narrower rear portion for each compartment 11 of the panels 10, and arranged for allowing the flower pots or plant pots 30 to be easily and quickly engaged into the compartments 11 of the panels 10 and to be easily and quickly attached or mounted to the panels 10. The plant pots 30 each include a notch 31 formed in the bottom or lower portion thereof for engaging with the lower inclined surface 17 of the panel 10 and for solidly and stably latching and anchoring and retaining the plant pot 30 to the panel 10, and each include an upper engaging surface 32 formed in the upper portion of each of the two side walls 39 for engaging with the upper inclined surface 16 of the panel 10 and for further solidly and stably anchoring and retaining or securing the plant pot 30 to the panel 10.

The plant pots 30 each further include an outwardly extended stop 33 formed and located beside or on one side or the front portion of the upper engaging surface 32 of the side wall 39 for engaging with the panels 10 (FIGS. 1-2, 4, 8 and 16) and for further latching and anchoring and retaining the plant pot 30 to the panel 10, and each further include a latch 34 extended outwardly from each of the two side walls 39 and formed and located beside or on the other side or the rear portion of the upper engaging surface 32 (FIGS. 5, 7) for engaging with the panels 10 (FIGS. 3, 8-9 and 16-17) and thus for further easily and quickly latching and anchoring and retaining the plant pot 30 to the panel 10, and for allowing the plant pot 30 to be easily and quickly disengaged or detached from the panel 10 when depressing the side walls 39 of the plant pot 30 to disengage the latches 34 from the panel 10.

Figure 1:
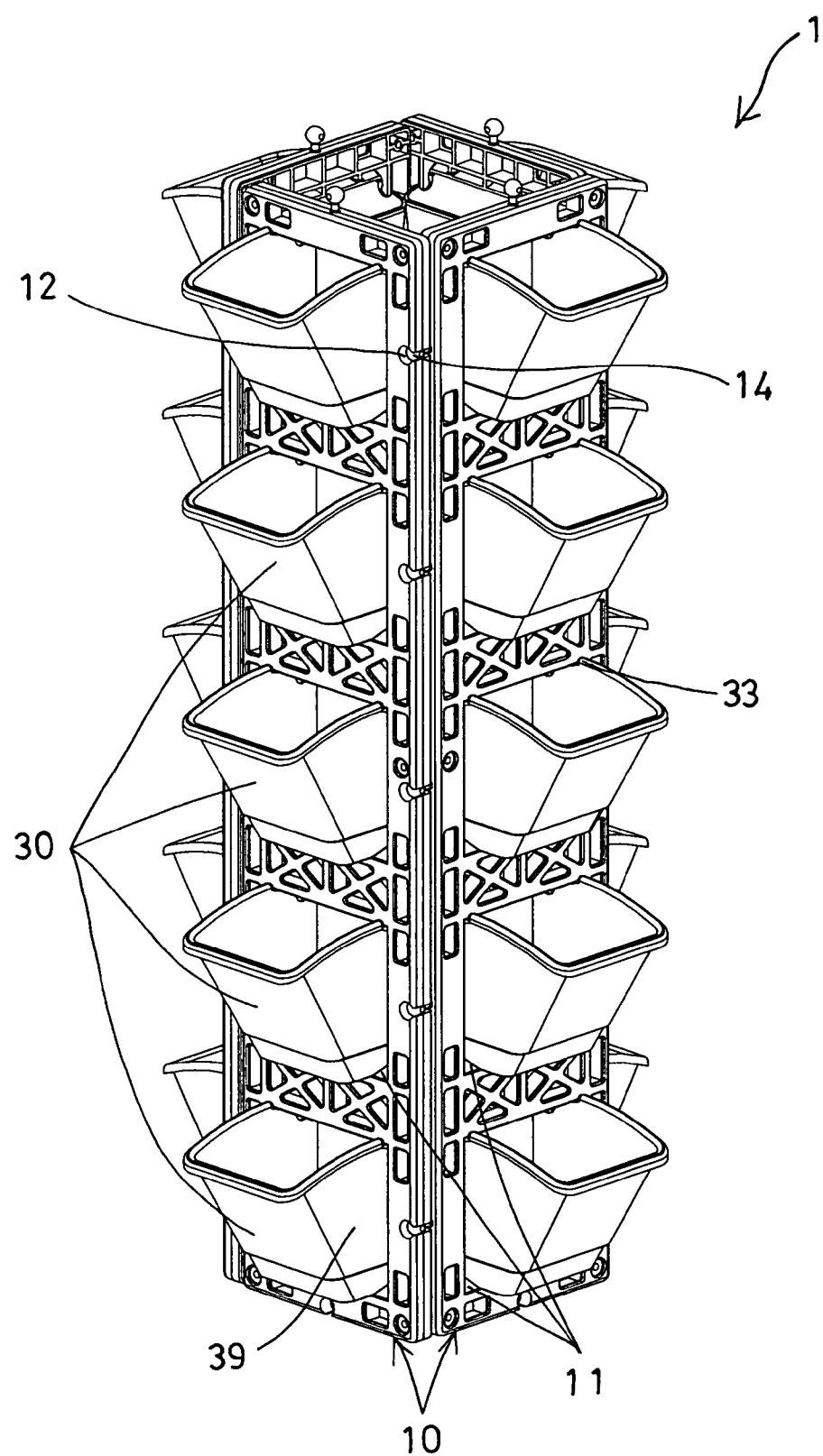
FIG. 1 is a perspective view of a plant pot holding device in accordance with the present invention.
Figure 2:
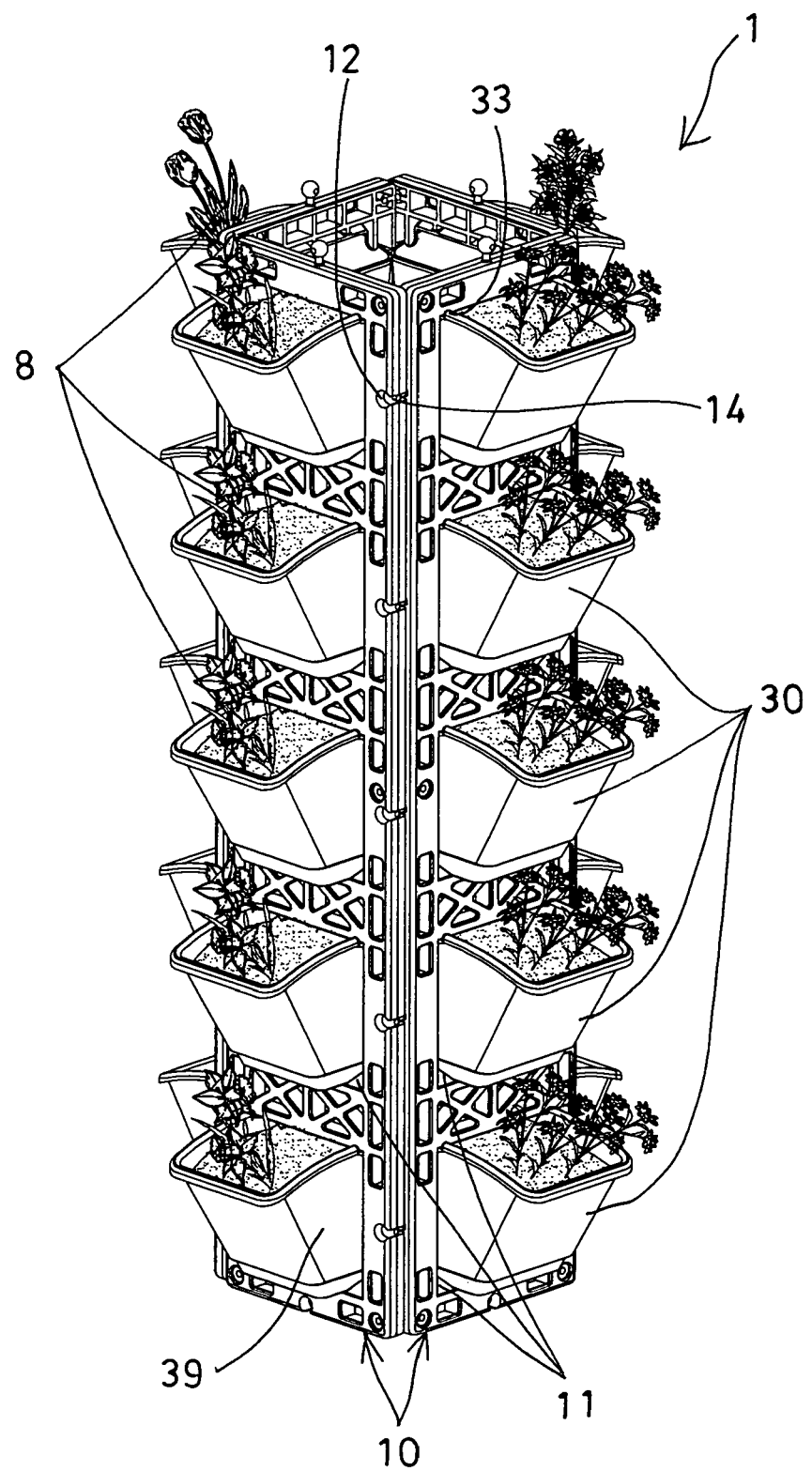
FIG. 2 is another perspective view similar to FIG. 1, illustrating the operation of the plant pot holding device.
Figure 3:
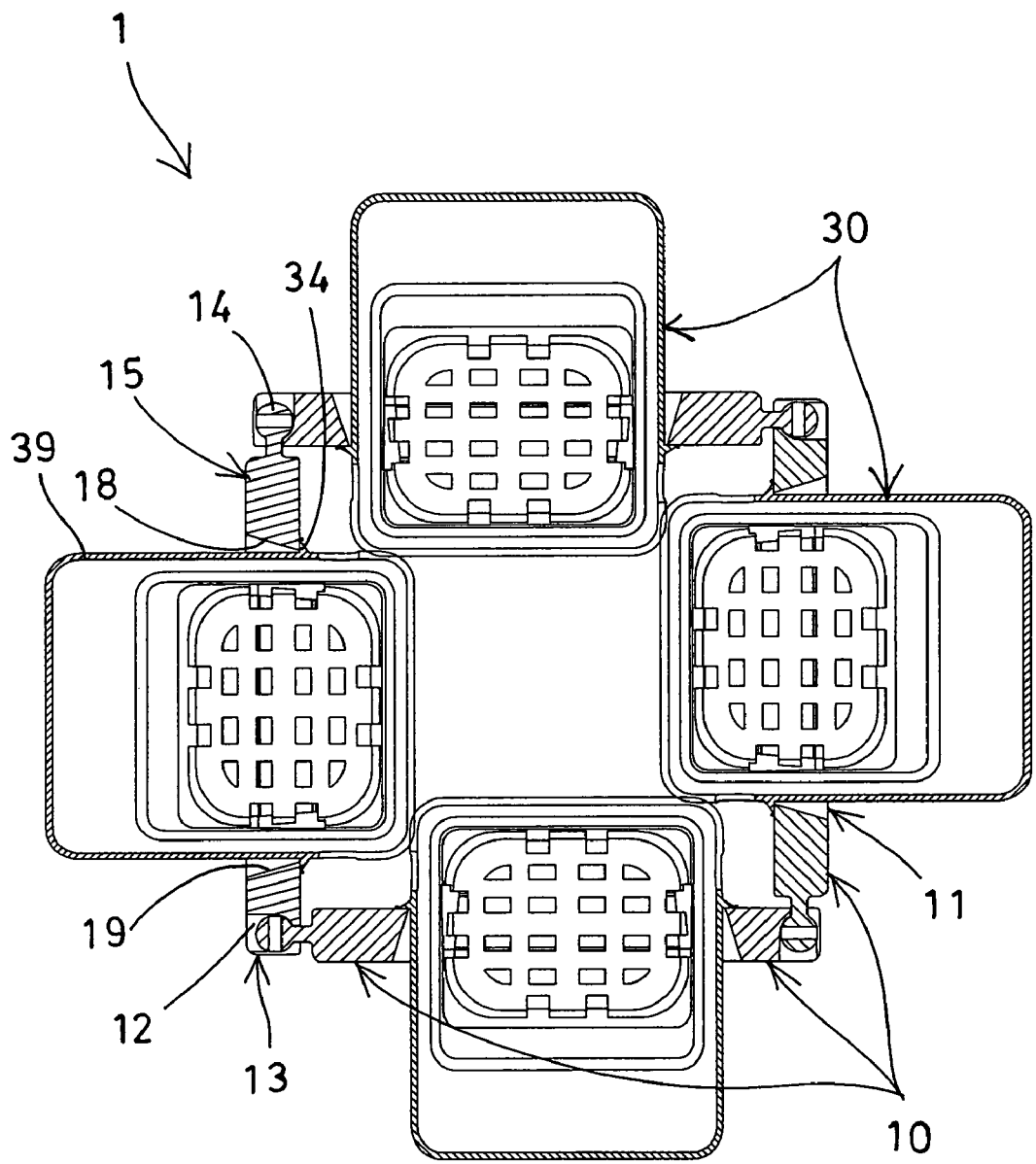
FIG. 3 is a top plan schematic view of the plant pot holding device, in which a portion of the plant pot holding device has been cut off for showing the inner structure of the plant pot holding device.
Figure 7:
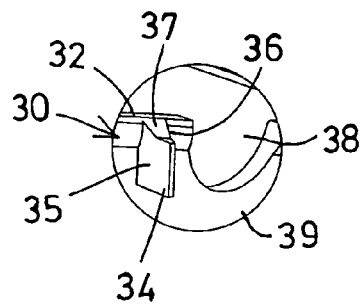
FIG. 7 is another enlarged partial perspective view illustrating the plant pot of the plant pot holding device.
Figure 6:
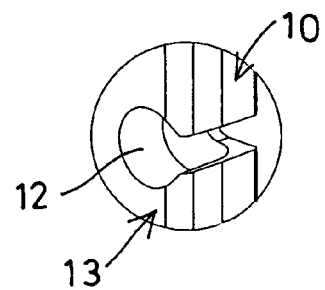
FIG. 6 is an enlarged partial perspective view illustrating the panel of the plant pot holding device.
Figure 5:
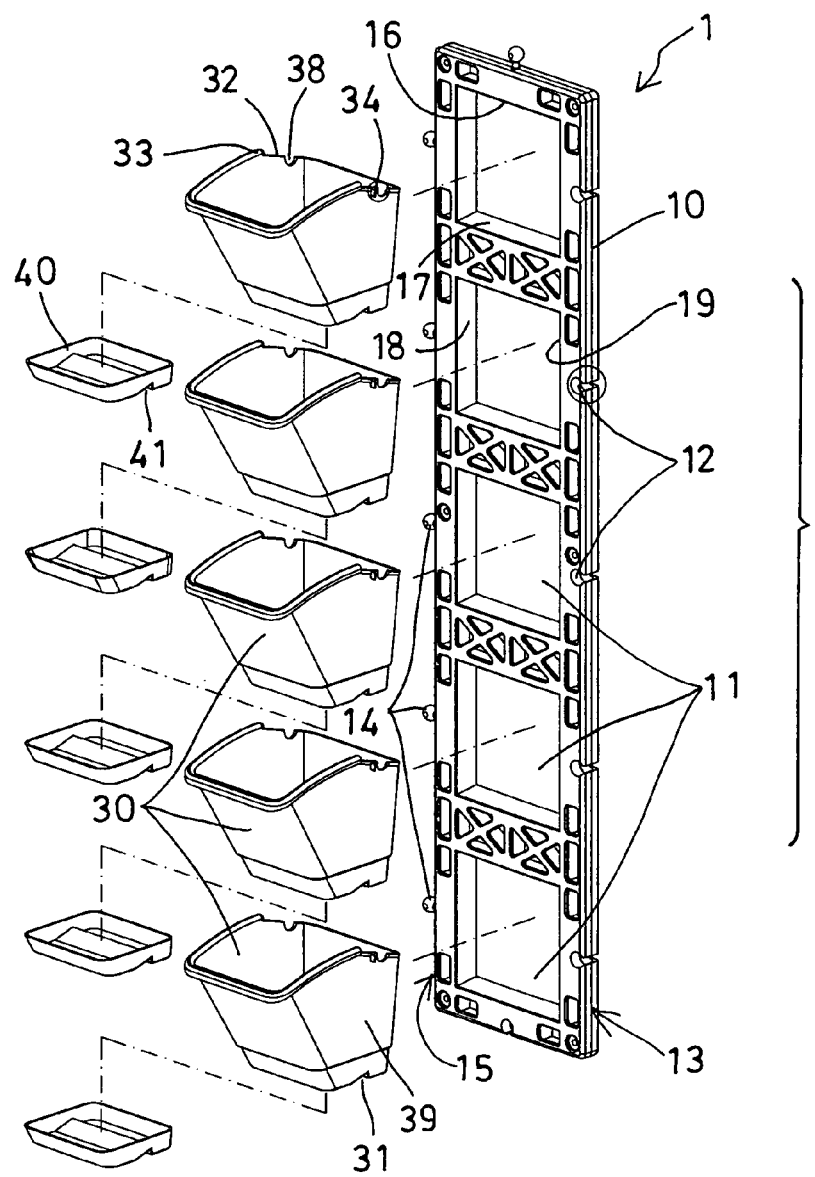
FIG. 5 is a partial exploded view of the plant pot holding device.
Figure 8:
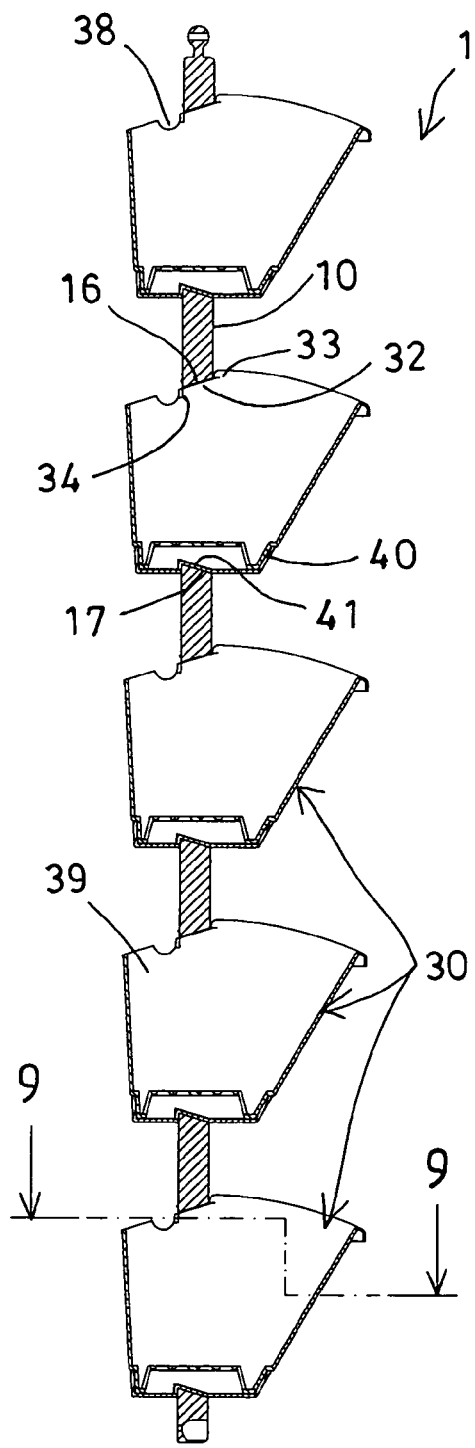
FIG. 8 is a cross sectional view of the plant pot holding device taken along lines 8-8 of FIG. 4.
Figure 9:
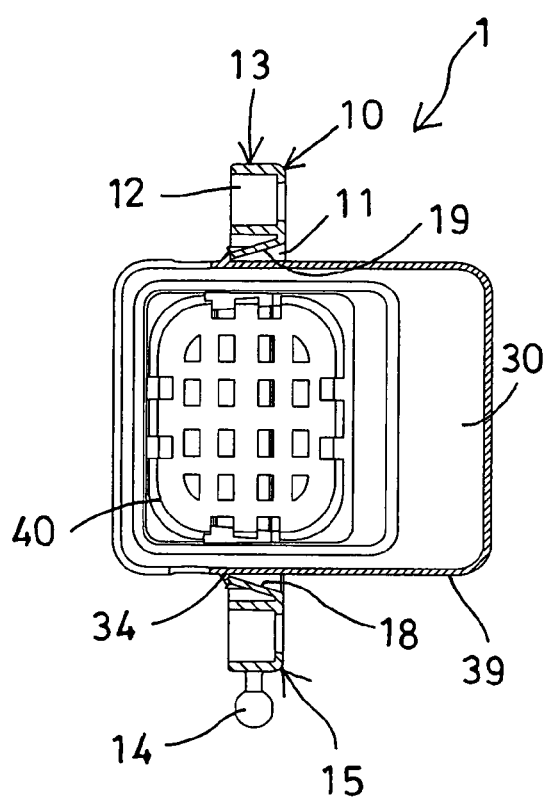
FIG. 9 is a cross sectional view of the plant pot holding device taken along lines 9-9 of FIG. 8.
Figure 11:
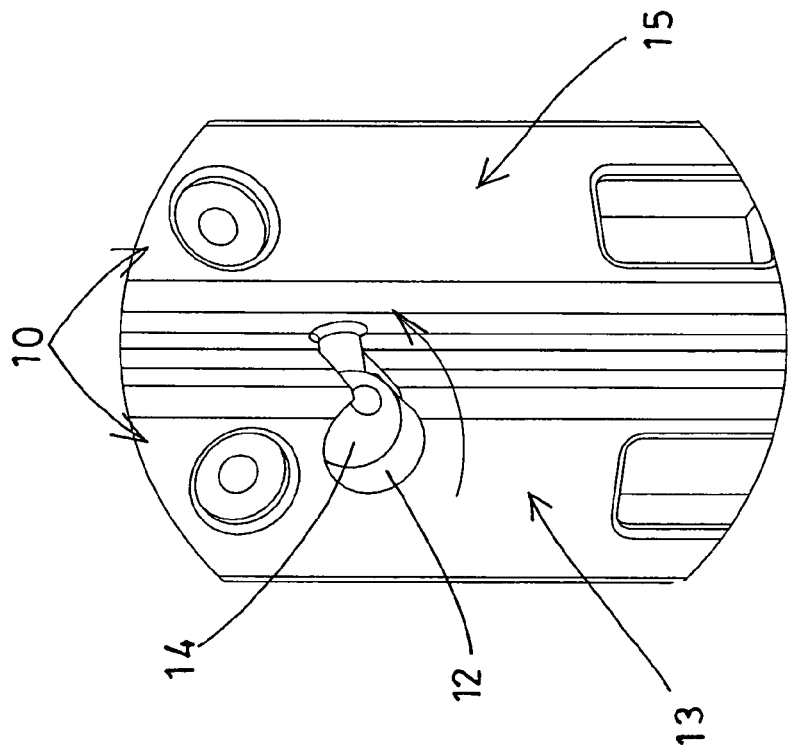
FIGS. 10, 11 are further enlarged partial perspective views illustrating the operation or the coupling of the panels of the plant pot holding device.
Figure 10:
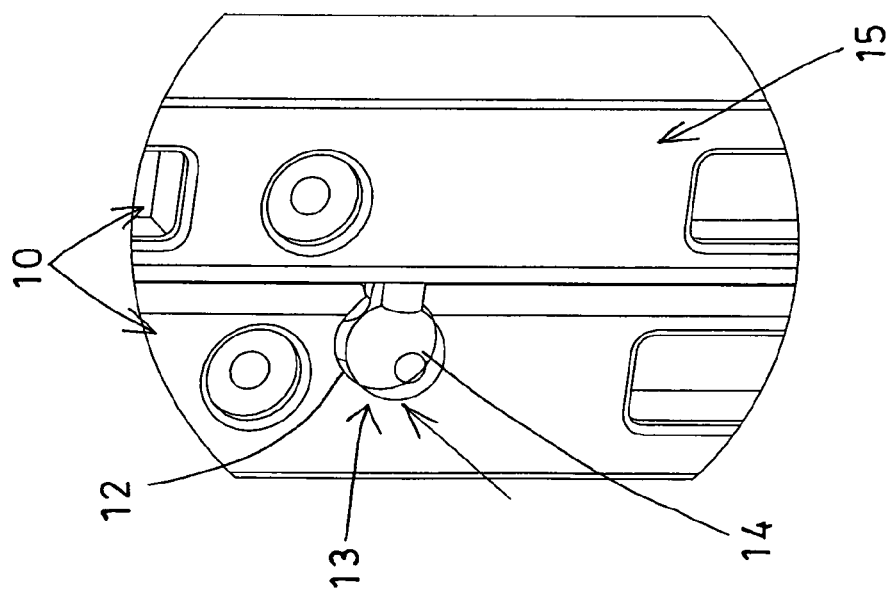

As shown in FIG. 7, it is preferable that the latches 34 each include one or more (such as two) tapered or inclined side surfaces 35, 36, and/or a tapered or inclined top or upper surface 37 formed thereon for allowing the latches 34 to be easily and quickly engaged with and moved over or beyond the panel 10, and thus for allowing the plant pot 30 to be easily and quickly attached to or disengaged or detached from the panel 10. The plant pots 30 each may further include a recess or depression 38 formed in each of the two side walls 39, such as formed in the upper portion of each of the two side walls 39 and formed and located beside or on the other side or the rear portion of the upper engaging surface 32 (FIGS. 5, 8, 16) for engaging with or for supporting the water spraying or supplying hoses (not shown) which may supply the water to the plants 8 that are planted in the plant pots 30 (FIG. 2).

The plant pots 30 each may further include a perforated tray 40 disposed or engaged into the inner portion or the inner chamber of the plant pot 30 (FIGS. 5 and 8-9) for supporting the soil above the perforated tray 40 and for allowing the water to flow into the space formed between the perforated tray 40 and the bottom or lower portion of the plant pot 30, and the perforated tray 40 may also include a notch 41 formed in the bottom or lower portion thereof for engaging with the lower inclined surface 17 of the panel 10 (FIG. 8), and may be arranged for allowing the perforated tray 40 to be easily and quickly disengaged or detached from the plant pot 30 when required.

Figures 16, 17:
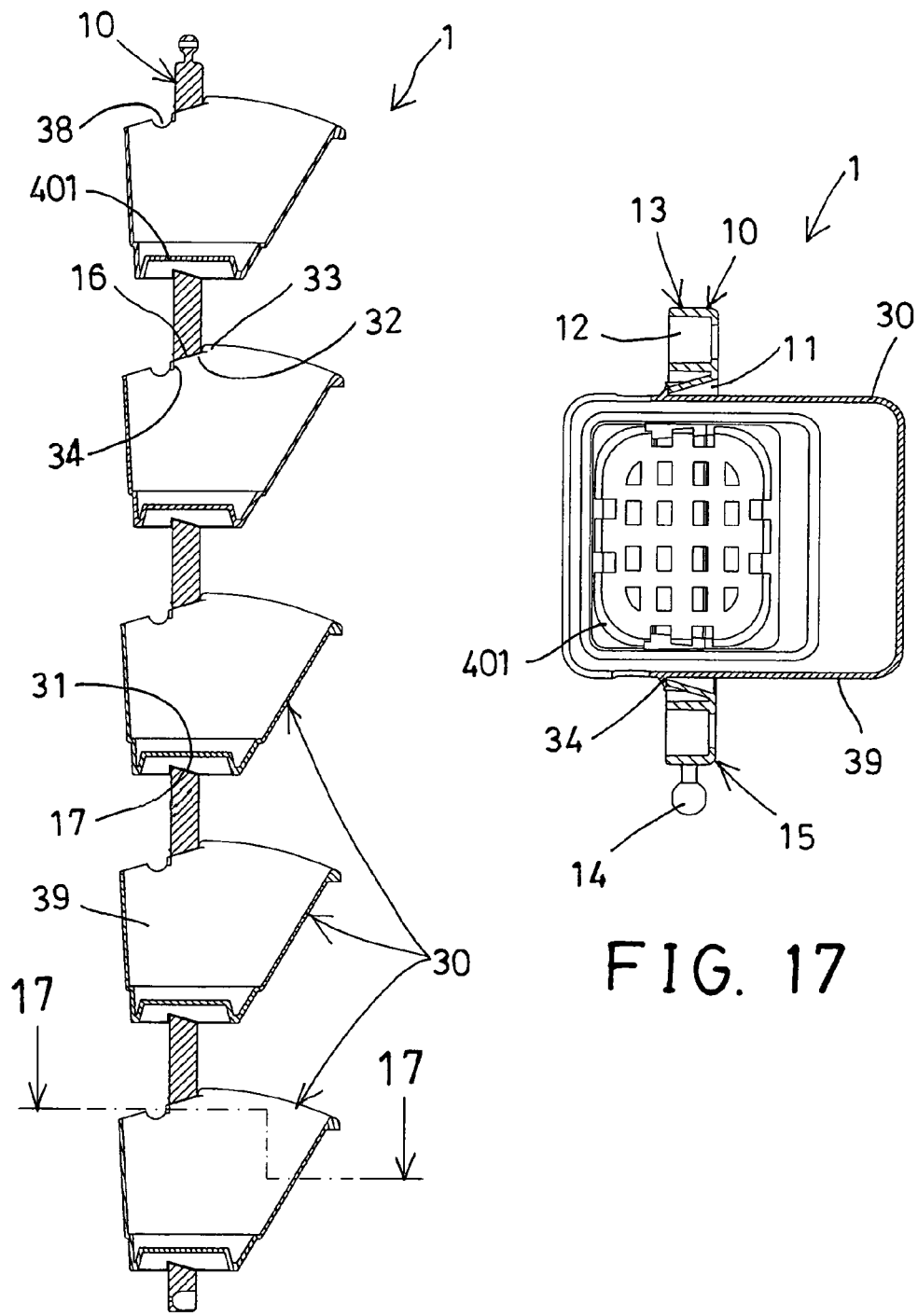
FIG. 16 is a cross sectional view similar to FIG. 8 illustrating the other arrangement of the plant pot holding device.
FIG. 17 is a cross sectional view of the plant pot holding device taken along lines 17-17 of FIG. 16.

Alternatively, as shown in FIGS. 16-17, the perforated tray 401 may also be formed integral with the plant pot 30 with such as the molding or mold injection processes, and may be formed as a bottom tray 401 for the plant pot 30. In operation, as shown in FIGS. 1-3, and 12-15, two or more panels 10 may be easily and quickly engaged with each other and coupled or secured together to form various spatial or three-dimensional shapes or configurations, and each panel 10 may include a number of compartments 11 formed therein for detachably engaging with or supporting the plant pots 30, and thus for supporting a large number of plant pots 30 simultaneously.

Accordingly, the plant pot holding device in accordance with the present invention includes one or more panels that may be selectively or changeably engaged or coupled together to various shapes or configurations, such as the spatial or three-dimensional shapes or configurations, and includes a number of compartments formed in each of the panels for detachably engaging with or supporting plant pots.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A plant pot holding device comprising:
    a panel having a plurality of quadrangular compartments, each defined by an upper inclined surface, a lower inclined surface, and two side inclined surfaces, each quadrangular compartment having a wider open front portion and a narrower open rear portion; and
    a plurality of plant pots, each detachably mounted to one of the compartments and having two side walls and a notch, each of the side walls having an upper engaging surface and a latch, the upper engaging surface being formed at a top edge of the side wall and contacting against the upper inclined surface between the latch and a stop on the side wall, the latch having vertical surfaces and extending horizontally outwards from each sidewall for engagement with the side inclined surfaces, the notch being formed at a bottom side of the plant pot and engaged with the lower inclined surface, whereby the plant pot is detachably engaged with the panel.

2. The plant pot holding device as claimed in claim 1, wherein the stop on each of the side walls extends outwardly from the top edge.

3. The plant pot holding device as claimed in claim 1, wherein each of the side walls comprises a depression recessed from the top.

4. The plant pot holding device as claimed in claim 1 further comprising a tray, wherein the tray is mounted to the bottom side of the plant pot.

5. The plant pot holding device as claimed in claim 4, wherein the tray comprises a notch.

6. The plant pot holding device as claimed in claim 4, wherein the tray is fixed to the bottom side of the plant pot.

7. The plant pot holding device as claimed in claim 4, wherein the tray comprises a notch formed at the bottom side of the tray.

8. A plant pot holding device comprising:
a plurality of panels each having a plurality of quadrangular compartments, each quadrangular compartment defined by an upper inclined surface, a lower inclined surface, and two side inclined surfaces, and a first side portion, and a second side portion opposite to the first side portion, each quadrangular compartment having a wider open front portion and a narrower open rear portion, the first side portion having at least one spherical coupler, the second side portion having at least one socket, each of the spherical couplers being selectively movably engaged in the at least one socket; and
a plurality of plant pots, each detachably mounted to on of the compartments plant pot and each having two side walls and a notch, each of the side walls having an upper engaging surface and a latch, the upper engaging surface being formed at a top edge of the side wall and contacting against the upper inclined surface between the latch and a stop on the sidewall, the latch having vertical surfaces and extending horizontally outwards from each sidewall for engagement with the side inclined surfaces, the notch being formed at a bottom side of the plant pot and engaged with the lower inclined surface, whereby each of the plants pots is detachably engaged with one of the panels.

9. The plant pot holding device as claimed in claim 8, wherein the stop on each of the side walls extends outwardly from the top edge.

10. The plant pot holding device as claimed in claim 8, wherein each of the side walls comprises a depression recessed from the top edge.

11. The plant pot holding device as claimed in claim 8 further comprising a plurality of trays, wherein each of the trays is mounted to the bottom side of one of the plant pots.

12. The plant pot holding device as claimed in claim 11, wherein each of the trays comprises a notch.

13. The plant pot holding device as claimed in claim 11, wherein each tray is fixed to the bottom side of one of the plant pots.

14. The plant pot holding device as claimed in claim 11, wherein each of the trays comprises a notch formed at a bottom side.

* * * * *